United States Patent [19]

Aramaki et al.

[11] 4,438,086

[45] Mar. 20, 1984

[54] METHOD FOR PREPARATION OF GRAPHITE FLUORIDE BY CONTACT REACTION BETWEEN CARBON AND FLUORINE GAS

[75] Inventors: Minoru Aramaki; Yasushi Kita; Hishagi Nakano; Shiro Moroi, all of Ube, Japan

[73] Assignee: Central Glass Company Limited, Ube, Japan

[21] Appl. No.: 413,889

[22] Filed: Sep. 1, 1982

[30] Foreign Application Priority Data

Sep. 2, 1981 [JP] Japan ............................. 56-136963

[51] Int. Cl.$^3$ ..................... C01B 31/04; C01B 9/08; C01B 31/30
[52] U.S. Cl. .................................... 423/448; 423/439; 423/445; 423/449; 423/489; 423/496; 422/198; 422/236
[58] Field of Search ............... 423/448, 445, 449, 450, 423/439, 489, 496; 422/198, 236; 570/150

[56] References Cited

U.S. PATENT DOCUMENTS

| | | | |
|---|---|---|---|
| 2,734,800 | 2/1956 | Brooks | 423/448 |
| 3,872,032 | 3/1975 | Kanemaro et al. | 570/150 |
| 3,929,920 | 12/1975 | Komo et al. | 423/439 X |

FOREIGN PATENT DOCUMENTS 2736861 8/1978 Fed. Rep. of Germany ...... 423/439
705705 8/1951 United Kingdom .
1509100 4/1978 United Kingdom .
2034597 6/1980 United Kingdom .

Primary Examiner—Gregory A. Heller
Attorney, Agent, or Firm—Fleit, Jacobson, Cohn & Price

[57] ABSTRACT

A method and apparatus for preparation of a graphite fluoride such as $(CF)_n$ or $(C_2F)_n$ by heterogeneous contact reaction between a carbon material such as graphite or petroleum coke and fluorine gas at about 200°–550° C. The carbon material in the form of small pieces such as granules or powder particles is kept in a holder having a number of openings so as to form a carbon material layer in the holder, which is placed in a reactor so as to leave gas passages around the holder. With heating, fluorine gas is forcibly passed through the gas passages without agitating the carbon material in the holder. The openings of the holder are shaped and arranged such that the fluorine gas permeates through the carbon material layer in the holder. For example, the holder is an open-type box made of either a wire screen or a perforated metal plate, or a conveyor belt made of a wire screen. This method is effective for prevention of spontaneous decomposition of the formed graphite fluoride attributed to accumulation of the heat of reaction within the reacting carbon material layer and/or mechanical shocks or vibrations to the fluorinated carbon.

15 Claims, 3 Drawing Figures

METHOD FOR PREPARATION OF GRAPHITE FLUORIDE BY CONTACT REACTION BETWEEN CARBON AND FLUORINE GAS

BACKGROUND OF THE INVENTION

This invention relates to a method of preparing a graphite fluoride by heterogeneous contact reaction between solid carbon and fluorine gas and an apparatus for performing this method.

Graphite fluorides are generally expressed by $(CF_x)_n$, and $(CF)_n$ and $(C_2F)_n$ are typical examples of graphite fluorides already confirmed to exist as stable solid compounds. These graphite fluorides have been put into industrial use as lubricants, activating agents for electrolytic cells, water- and oil-repellents and anti-contamination agents for example, but there is an eager demand for an improved method for mass production of such graphite fluorides.

At present it is prevailing to prepare a graphite fluoride by heterogeneous contact reaction between carbon and fluorine gas as exemplified by the following equations:

$$2nC(s) + nF_2(g) \rightarrow 2(CF)_n(s) \ldots \quad (1)$$

$$4nC(s) + nF_2(g) \rightarrow 2(C_2F)_n(s) \ldots \quad (2)$$

in the parentheses, s and g represent solid phase and gas phase, respectively. The reaction of Equations (1) and (2) are both exothermic reactions.

However, it is usual that some side reactions accompany either of the reactions of Equations (1) and (2). In the case of the reaction of Equation (1) for example, the following reactions take place as the reaction (1) proceeds:

$$4(CF)_n \rightarrow 3nC^* + nCF_4 \uparrow \ldots \quad (3)$$

$$C^* + 2F_2 \rightarrow CF_4 \uparrow \ldots \quad (4)$$

wherein C* represents activated carbon.

The reaction of Equation (4) generates particularly large amount of heat of reaction since the heat of formation $\Delta H$ of $CF_4$ by this reaction is as large as $-46.7$ Kcal/mole and, therefore, causes the temperature of the reaction system to rise significantly. Then the reaction (3) is further promoted with resultant augmentation of the reaction (4), and finally there occurs explodingly rapid and violent decomposition of the entire graphite fluorides in the reaction system. Besides the problem of these side reactions, sometimes depending on the properties of the carbon material the reaction of Equation (1) does not proceed smoothly, and a different reaction represented by the following equation takes place instead.

$$C + 2F_2 \rightarrow CF_4 \uparrow \ldots \quad (5)$$

This reaction too is significantly exothermic and, therefore, becomes a cause of accumulation of heat in the reaction system.

The result of the aforementioned exploding decomposition of the fluorinated carbon is not always limited to the loss of the entire product of the process: sometimes the reaction vessel is seriously damaged by the exploding decomposition. Therefore, in the industrial preparation of a graphite fluoride by reaction between solid carbon such as powdery or granular graphite and fluorine gas, it becomes a matter of important concern to prevent local accumulation of heat generated by the above described exothermic reactions in the solid phase of the reaction system.

Conventional methods for the preparation of graphite fluorides include a batch process, wherein fluorine gas is passed or circulated through a reactor in which a carbon material is placed, and a continuous process wherein both fluorine gas and a powdery or granular carbon material are continuously introduced into a suitably designed reactor such as a rotary kiln. In either process a rotating or vibrating force is exerted on the carbon material under reaction in order to dissipate the heat of reaction from the solid phase of the reaction system and also to realize efficient contact of fluorine gas with the powdery or granular carbon material. However, such agitation of the carbon material cannot be taken as fully effective since the conventional methods have often suffered from decomposition of the formed graphite fluoride.

SUMMARY OF THE INVENTION

It is an object of the present invention to provide an improved method of preparing a graphite fluoride by heterogeneous contact reaction between solid carbon and fluorine gas, in which method local accumulation of the heat of reaction can effectively be prevented so that the intended reaction can be completed with no possibility of significant decomposition of the formed graphite fluoride.

It is another object of the invention to provide a novel apparatus for performing the method according to the invention.

This invention provides a method of preparing a graphite fluoride by heterogeneous contact reaction between a solid carbon material and fluorine gas, and the improvement according to the invention comprises the steps of keeping a carbon material in the form of relatively small pieces in a holder having a plurality of openings such that the carbon material forms a layer in the holder and keeping the holder in a reaction vessel such that gas passages are left around the holder, and heating the carbon material in the holder and, simultaneously, forcibly passing a fluorine gas through the gas passages in the reaction vessel without agitating the carbon material in the holder. The openings of the holder are so distributed and so large in the total area that a portion of the fluorine gas permeates through the carbon material layer in the holder.

The method according to the invention is particularly suitable for the preparation of a graphite fluoride expressed by $(CF_x)_n$ where x is in the range from 0.1 to 1.4.

As the basis of this invention, we have discovered that a graphite fluoride formed in the hereinbefore described heterogeneous contact reaction process very often undergoes rapid decomposition when the fluorinated carbon or the mixture of the fluorinated carbon and the starting carbon material is vigorously agitated or subjected to mechanical shocks or vibrations, and that the probability of the decomposition becomes surprisingly low when the carbon material and the formed fluorocarbon are left still throughout the reaction process even though the important factors such as the reaction temperature, partial pressure of fluorine gas in the reactor and the quantity of the carbon material in the reactor are unchanged. In the method according to the invention, therefore, the fluorination reaction process is carried out without agitating the carbon material by circulating fluorine gas around the carbon material kept in a holder.

However, the omission of agitation of the carbon material under reaction is impractical unless the problem of heat accumulation in the carbon material is solved. The present invention has solved this problem by an ingenious method. Since the reaction herein concerned with is significantly exothermic as described hereinbefore, it is expected that vigorous convection of heat generated by the reaction will take place around the fluorinated carbon particles. Actually, the expected convection of heat does not easily take place in the carbon material when it is left still, and the accumulation of the heat leads to a great rise in the temperature of the partly fluorinated carbon material and often results in violent decomposition of the fluorinated carbon. We have recognized that the expected convection of heat is suppressed because the fluorine gas intruded into the interior of the carbon material, which is subjected to reaction in a heaped state, does not smoothly flow and stagnates around the fluorinated carbon particles. In the method according to the invention, a portion of the fluorine gas forcibly passed through the gas passages in the reactor smoothly permeates through the carbon material layer in the holder which has many openings sufficiently large in the total area thereof. Accordingly there occurs effective convection of heat even in the interior of the carbon material layer, and therefore the heat transfers efficiently from the carbon material layer to the fluorine gas flowing along the exposed surfaces of the carbon material layer.

The method of the invention can be performed as either a batch process or a continuous process. In the case of a batch process, a preferred embodiment of the holder for the carbon material is a relatively shallow open-top box made of either a screen or a perforated plate of a metal compatible with fluorine gas at high temperatures, such as nickel, aluminum or monel metal. In the case of a continuous process, it is preferred to use a belt conveyor of which the belt is made of a wire screen of nickel or an alternative metal. In either case this method does not suffer from decomposition of the fluorinated carbon and is quite effective for uniformly maintaining the intended reaction temperature in every portion of the carbon material under reaction. Furthermore, in this method the chemical compositions of both the solid phase and gas phase of the reaction system become very uniform, and consequentially it is possible to obtain a desired graphite fluoride with high uniformity of quality. As an additional merit of the avoidance of agitation of the carbon material, the interior of the reactor remains free from carbon dust which is not only contaminating but also obstructive to smooth permeation of the fluorine gas into the carbon material layer.

An apparatus according to the invention for use in the above described method comprises at least one holder having a plurality of openings for keeping therein a layer of a carbon material in the form of relatively small pieces, a reaction vessel which can keep therein the holder or holders such that gas passages are left around each holder, heating means for heating the interior of the reaction vessel, and means for forcibly passing a fluorine gas through the gas passages in the reaction vessel. The openings of each holder are so distributed and so large in the total area that a portion of the fluorine gas permeates through the carbon material layer in each holder.

DESCRIPTION OF THE PREFERRED EMBODIMENTS

Figure 1:
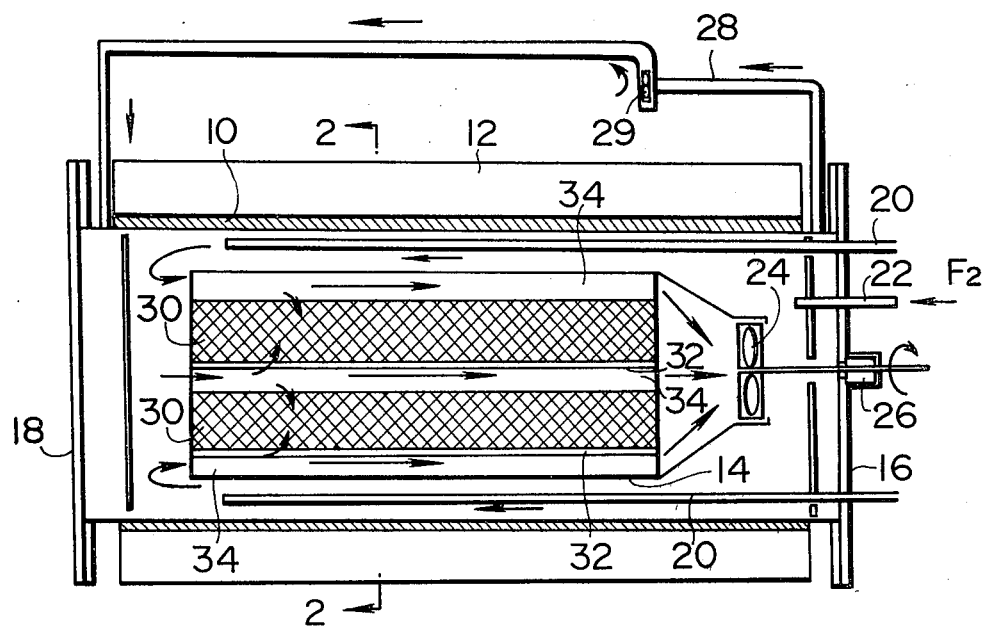
FIG. 1 is a schematic and sectional side elevation view of a batch process apparatus according to the invention.
Figure 2:
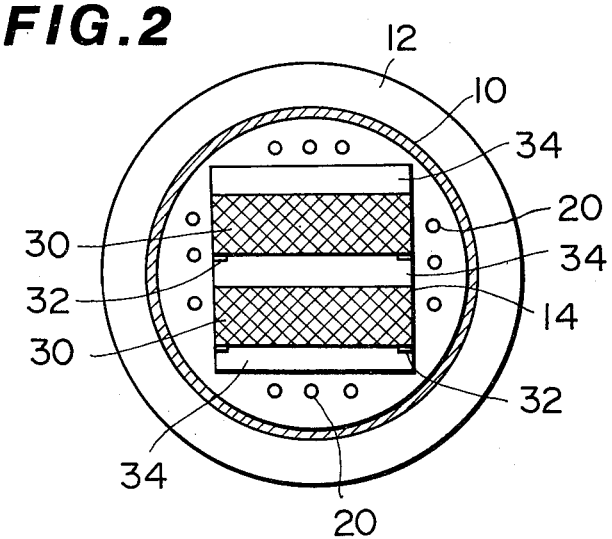
FIG. 2 is a sectional view taken along the line 2—2 in FIG. 1.

FIGS. 1 and 2 show an embodiment of apparatus according to the invention for performing the method according to the invention as a batch process.

This apparatus or reactor has a horizontally elongate cylindrical outer wall 10, which is surrounded by a cylindrically arranged heater 12. In the space defined by the outer wall 10, there is a reaction vessel 14 in the form of a hollow prism which is horizontally elongate and rectangular in cross section. The reactor has an end wall 16 and a door 18 at the opposite end to allow both the intake of a starting material and takeout of the product by this door 18. A plurality of cooling pipes 20 pass through the end wall 16 to extend horizontally in a space left between the cylindrical outer wall 10 and the inner reaction vessel 14. A gas duct 22 to supply a fluorine gas into the reactor passes through the end wall 16 and opens in the reactor at a short distance from the end wall 16. At one end facing the end wall 16, the reaction vessel 14 is provided with a fan 24 to force a gas to flow through the reaction vessel 14 from the opposite end toward the fan 24. The shaft of the fan 24 passes through the end wall 16 with the provision of a seal 26. Additionally, the reactor is provided with an external gas circulation duct 28 one end of which opens into the space between the outer wall 10 and the inner reaction vessel 14 in an end region near the end wall 16, and the other end of the duct 28 opens into the same space in the opposite end region near the door 18. A fan 29 is disposed in this duct 28 to force a gas to pass through this duct 28 toward the left in FIG. 1.

A carbon material (not illustrated) to be fluorinated is placed into this reactor by using relatively shallow box-shaped holders 30. Each material holder 30 is open at the top and, in this embodiment, is made of a screen of nickel wire. In the reaction vessel 14, a plurality of brackets 32 are attached to the side walls to support the material holders 30 inserted into the reaction vessel 14 horizontally in the manner of double-decker shelves. The brackets 32 are positioned such that spaces 34 are left between the two holders 30, between the upper holder 30 and the top wall of the reaction vessel 14, and between the lower holder 30 and the bottom wall of the reaction vessel 14. These spaces 34 become gas passages by the action of the aforementioned fan 24.

Alternative to the use of a wire screen, the material holders 30 may be made of a nickel plate, or an aluminum plate in cases where the reaction temperature in the reactor is below about 400° C., formed with a large number of apertures. In every case the openings in the bottom and every side of each holder 30 are made as many as possible and as wide as possible within the limitation that the particles or grains of the carbon material contained in the holder 30 should not pass through the openings. Optionally, the side walls of the reaction vessel 14 may be formed with apertures, and/or the width of each holder 30 may be so determined as to leave a space between the holder 30 and each side wall of the reaction vessel 14.

There is no particular limitation on the kind or type of carbon material for use in the method of the invention, and either amorphous carbon or crystalline carbon can be used. Natural graphite, synthetic graphite, petroleum coke, carbon black and activated carbon can be named as typical examples of practical carbon materials. As to the physical form of the carbon material, a sole requirement is that the carbon material should be divided into relatively small pieces, usually into pieces smaller than about 10 mm. The small pieces of the carbon material may be spherical or differently shaped grains, blocks, lumps, flakes or powder particles for example. It is optional to use a relatively fine powder of carbon, but in such a case it is preferred that the mean particle size of the carbon powder is not smaller than about 50 $\mu$m from the viewpoint of suppressing the decomposition of the fluorinated carbon.

As the initial step of a fluorinating process by using the reactor of FIGS. 1 and 2, the carbon material is put into the material holders 30 which are yet outside the reactor such that the carbon material in each holder 30 forms a layer having a suitable and practically uniform thickness. Although productivity of the process will increase as the thickness of the carbon layer in each holder 30 is increased, an unlimitedly or thoughtlessly large thickness of the carbon material layer is contrary to the intention of preventing accumulation of the heat of reaction in the carbon layer by utilizing convection of heat around and also within the carbon layer. Although the upper boundary of a suitable range of the thickness is variable depending on the physical form of the carbon material, it is preferred that the thickness is below about 150 mm when the carbon material is in the form of relatively large pieces such as granules, lumps or flakes but is below about 70 mm when the carbon material is a powder.

Then the material holders 30 are inserted into the reaction vessel 14, and the door 18 is closed. It will be understood that the illustrated double-decker arrangement of the material holders 30 is not limitative. If desired, the reaction vessel 14 may be so designed as to receive only one material holder or to receive three to five material holders in a multi-decker arrangement.

Next, fluorine gas is introduced into the reactor by using the duct 22, and the heater 12 is operated to raise the temperature in the reaction vessel 14 to a predetermined level which ranges from about 200° C. to about 550° C. in general. During the fluorinating reaction the supply of fluorine gas into the reactor is continued, and the temperature of the heater 12 and the cooling pipes 20 are controlled to maintain the intended reaction temperature in the reaction vessel 14.

It is possible to use practically pure fluorine gas of any origin. For example, use may be made of fluorine gas obtained by usual electrolysis of a mixture of potassium fluoride and hydrogen fluoride or a refined fluorine gas commercially availabe in the state filled in bombs. However, it is more favorable for control of the rate of the reaction to use a diluted fluorine gas containing, for example, 30–50% of an inactive gas such as nitrogen or helium.

The reaction temperature is variously determined depending on the kind and physical form of the carbon material and also on the chemical structure of the graphite fluoride to be produced. In the cases of producing $(C_2F)_n$ a suitable range of the reaction temperature is from about 300° C. to about 500° C., but in the cases of producing $(CF)_n$ a suitable range of the reaction temperature broadens to from about 200° C. to about 550° C. If desired, the fluorinated carbon in the reaction vessel 14 can be crystallized by raising the temperature in the reaction vessel 14 up to about 600° C. after completion of the fluorinating reaction.

The fluorine gas introduced into the reactor through the duct 22 flows in the space between the outer wall 10 of the reactor and the reaction vessel 14 toward the left in FIG. 1, as indicated by arrows, and enters the reaction vessel 14 from its left end opening. Then the fluorine gas flows through the gas passages 34 in the reaction vessel 14 toward the right in FIG. 1 by the suction action of the fan 24. Since the carbon material is contained in the holders 30 of the above described structure, a portion of the flowing fluoring gas easily permeates into the interior of the carbon material layer in each holder 30 so that the entire carbon material makes contact with the fluorine gas during circulation of the fluorine gas for a sufficient period of time. The fluorine gas flowed out of the reaction vessel 14 by the action of the fan 24 again enters the space between the reaction vessel 14 and the outer wall 10 to repeat the above described circulation together with a succeedingly supplied portion of the fluorine gas. A portion of the circulating fluorine gas flows through the external duct 28 by the action of the fan 29 to reenter the reactor through the opening in the left end region. By continuing such a manner of forced circulation of the fluorine gas while the temperature in the reaction vessel 14 is maintained at a suitable level as mentioned above, the intended fluorination reaction can be completed without suffering from accumulation of the heat of the reaction in the carbon material under reaction. As will readily be understood, the flow velocity of the fluorine gas in the reaction vessel 14 is controlled to an adequate level since an excessively high flow velocity causes floating and scattering of the carbon material contained in the holders 30.

It is possible to further enhance the efficiency of liberation of the heat generated in the carbon material layer in each holder 30 into the circulating fluorine gas by placing a number of small pieces of a metal compatible with fluorine gas at high temperatures, such as nickel, aluminum or monel metal, in the carbon material layer.

After completion of the fluorination reaction which may optionally be followed by a crystallizing heating process, the residual portion of the fluorine gas is discharged from the reactor by using a vacuum pump, and the holders 30 containing the graphite fluoride are taken out of the reactor by the door 18.

Figure 3:
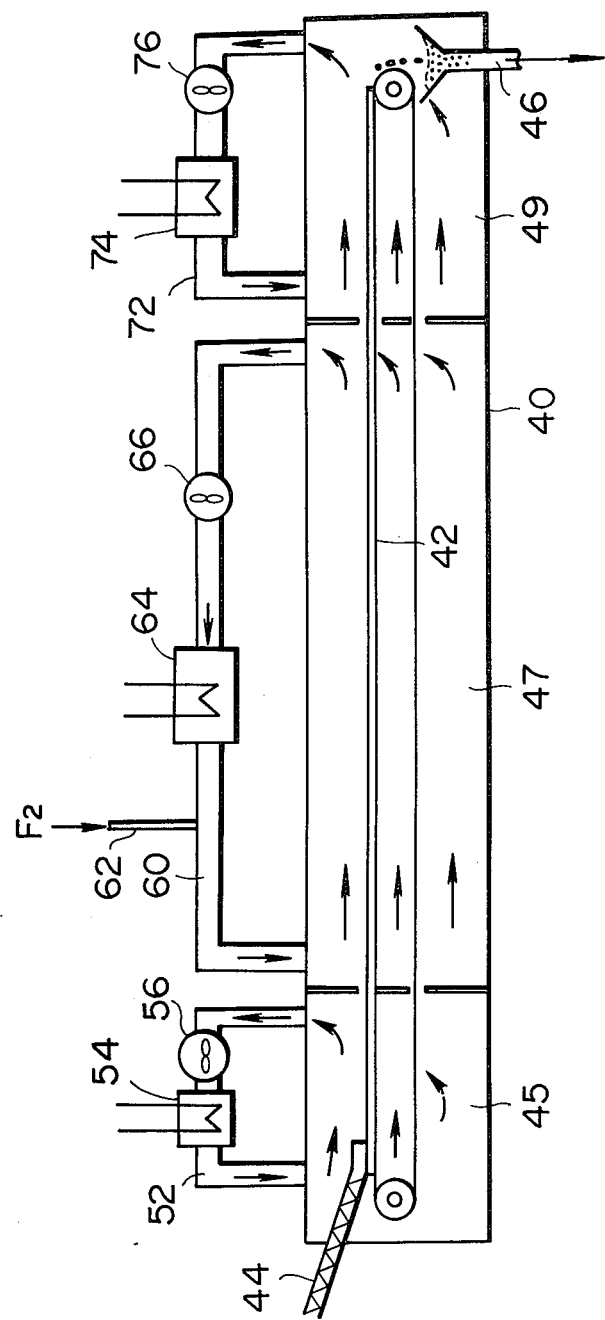
FIG. 3 is a diagrammatic illustration of a continuous process apparatus according to the invention.

FIG. 3 shows an embodiment of apparatus according to the invention for performing the method according to the invention as a continuous process.

Essentially the apparatus of FIG. 3 is made up of a closed reactor 40, a belt conveyor 42 disposed in the reactor 40 and a gas circuit for circulating a heated fluorine gas through the reactor 40. The belt of the conveyor 42 is made of a screen of nickel wire, and in this embodiment this conveyor belt serves as a material holder according to the invention. At the left end and belt conveyor 42 is provided with a carbon material feeder 44, and there is a collector 46 for takeout of the fluorinated carbon.

The interior of the reactor 40 is divided into a left end section 45 which will be called preheating zone, a middle section 47 called reaction zone and a right end section 49 called cooling zone. The preheating zone 45 is provided with a hot air circuit 52 including a heat exchanger 54 and a fan 56. The reaction zone 47 is provided with a fluorine gas circuit 60 including a fluorine gas supplying duct 62, a heat exchanger 64 and a fan 66 such that a heated fluorine gas, which may be a diluted fluorine gas as mentioned hereinbefore, continuously passes through this zone 47 along the direction of the movement of the conveyor belt. The cooling zone 49 is provided with a cold gas circuit 72 including a heat exchanger 74 and a fan 76.

In a continuous fluorination process using the apparatus of FIG. 3, a carbon material (not illustrated) in the form of small pieces is continuously supplied onto the belt conveyor 42, which is moving toward the right in FIG. 3 at a relatively slow speed such as tens to hundreds of millimeters per hour, so as to form a carbon material layer of a relatively small thickness on the conveyor belt. In the preheating zone 45 the carbon material on the belt conveyor 42 is heated to the level of an intended reaction temperature. The heated fluorine gas is forced to continue circulation through the reaction zone 47 and the external gas circuit 60 to thereby maintain the intended reaction temperature in the reaction zone 47. The reaction zone 47 is long enough to complete the intended fluorination reaction between the carbon material introduced into this zone 47 and the fluorine gas before the travel of the carbon material over the entire length of this zone 47. Of course the belt conveyor 42 is operated without vibration, and the flow velocity of the fluorine gas is controlled in the manner as described hereinbefore. In the cooling zone 49, the graphite fluoride on the conveyor belt is cooled to about 100° C. or below before the arrival at the entrance to the collector 46.

If desired, the reaction zone 47 in this apparatus may be divided into two or three sections to maintain different reaction tempratures in the respective sections.

As to the structural materials for the apparatus according to the invention, it is suitable to use either nickel or monel metal for parts subjected to high temperatures above about 400° C., and aluminum can be used for parts subjected to temperatures of about 300°–400° C. at the maximum. For parts not heated above about 150° C., use can be made of various materials such as ordinary steel, stainless steel, copper, brass, Teflon and fluorine rubber.

The invention is further illustrated by the following examples.

EXAMPLE 1

A material holder used in this example was in the shape of an open-top box and made of a 150-mesh wire screen (openings: 0.10 mm) of nickel. This holder was 100 mm in width, 200 mm in length and 200 mm in height. A box-shaped reactor to receive this holder was made of nickel plate and provided with heating means and fluorine gas circulating means. The inner dimensions of the reactor were 400 mm in width, 500 mm in length and 400 mm in height.

As the raw material, 1200 g of a granular synthetic graphite about 1–2 mm in grain size was put into the material holder to form a 75 mm thick layer of granular graphite in the holder. Then the holder was placed in the reactor, and an equivolume mixture of fluorine gas and nitrogen gas was continuously circulated in the reactor at a flow velocity of 100 cm/sec, while the heating means was operated to keep the temperature of the graphite in the reactor at 350°–400° C. The reaction between the graphite and fluorine in the mixed gas was completed by continuing the heating and the gas circulation for 45 hr without observing any indication of decomposition of the formed graphite fluoride. The product of this process was 2,460 g of $(C_2F)_n$, which remained in the holder as an about 150 mm thick layer.

EXAMPLE 2

A material holder identical in shape and dimensions with the one used in Example 1 was produced by using a 200-mesh wire screen (openings: 0.07 mm) of nickel.

As the raw material, 500 g of petroleum coke about 1–5 mm in grain size was put into the material holder to form an about 25 mm thick layer. Then the holder was placed in the reactor described in Example 1, and an equivolume mixture of fluorine gas and nitrogen gas was continuously circulated in the reactor at a flow velocity of 100 cm/sec, while the material in the holder was kept heated at 200°–350° C. The fluorinating reaction was completed by continuing the heating and the gas circulation for 70 hr without observing any indication of decomposition of the formed graphite fluoride. The product of this process was 1250 g of $(CF)_n$, which remained in the holder as an about 125 mm thick layer.

REFERENCE 1

The process of Example 1 was modified only in that the granular material under reaction was continuously stirred by operating a purposefully added stirrer at a rate of 10 rpm.

The reaction proceeded until fluorination of about 90% of the graphite to $(C_2F)_n$, though once there occurred weakly exploding decomposition of a portion of the fluorinated carbon in the course of this period. However, when the conversion reached 90% the entire amount of the formed graphite fluoride underwent spontaneous and instantaneous decmposition in the manner of explosion.

When this process was repeated by varying the reaction condition so as to obtain $(CF)_n$, weakly exploding decomposion of a portion of the fluorinated carbon occurred four times at some intervals before conversion of about 90% of the graphite, and when the conversion reached 95% the entire amount of the graphite fluoride underwent violently exploding decomposition.

REFERENCE 2

The process of Example 1 was identically carried out until conversion of about 95% of the graphite to $(C_2F)_n$. Then a ball of nickel weighing 100 g was dropped from the height of 500 mm onto the mixture of the graphite fluoride and unreacted portion of graphite while the mixture was still kept heated and exposed to the fluorine-nitrogen mixed gas. The shock of the dropped ball caused violently exploding decomposition of the entire amount of the graphite fluoride.

The same result was obtained when the process was repeated by varying the reaction condition so as to form $(CF)_n$.

EXAMPLES 3–8

A batch process reactor of the type as shown in FIGS. 1 and 2 was used throughout these examples. Each of the material holders 30 in the shape of open-top box was made of a nickel wire screen (150-mesh or 200-mesh) and had a width of 400 mm and a length of 1000 mm.

In Example 3, the granular synthetic graphite mentioned in Example 1 was put into each holder 30, which was made of 150-mesh nickel wire screen. The quantity of the graphite was adjusted such that the thickness of the graphite fluoride layer in the holder 30 after completion of the following reaction became 30 mm. In this example, five holders 30 were inserted into the reactor in the manner of five-layer shelves at vertical distances therebetween. The interior of the reactor was kept heated at 330°–420° C., and an equivolume mixture of fluorine gas and nitrogen gas was circulated in the reactor at a flow velocity of 100 cm/sec. By continuing the reaction for 70 hr the entire quantity of the graphite was fluorinated to $(C_2F)_n$ without observing any indication of decomposition of the product.

In Examples 4–8, the raw material was selected from the aforementioned synthetic graphite, a powdery natural graphite and the petroleum coke mentioned in Example 2, and the process of Example 3 was modified by selectively varying the quantity of the raw material in each holder 30 (i.e. thickness of the graphite fluoride layer obtained by the reaction), the number of the holders 30 in the reactor, the flow velocity of the fluorine-nitrogen mixed gas, reaction temperature and/or reaction time in the manner as shown in the following Table to form either $(C_2F)_n$ or $(CF)_n$. In every example the intended fluorinating reaction was completed without observing any indication of decomposition of the fluorinated carbon.

For comparison, an additional run was carried out by somewhat varying the parameters in the process of Example 4 also as shown in the Table. When the conversion of the graphite to fluoride reached about 95%, there occurred spontaneous and violent decomposition of the entire amount of the formed graphite fluoride. This is believed to be attributed to the excessively great thickness of the graphite fluoride layer in the holder 30.

The ranges of reaction temperature in the Table include temperatures elevated after reaction for crystallization of the product.

| | Raw Material (Mean Particle Size) | Thickness of Formed Graphite Fluoride Layer (mm) | Material Holder Wire Mesh (mesh) | Material Holder Number | Velocity of $F_2$–$N_2$ Gas Flow (cm/sec) | Reaction Temperature (°C.) | Reaction Time (hr) | Product |
|---|---|---|---|---|---|---|---|---|
| Example 3 | Synthetic Graphite (1–2 mm) | 30 | 150 | 5 | 100 | 330–420 | 70 | $(C_2F)_n$ |
| Example 4 | Synthetic Graphite (1–2 mm) | 150 | 150 | 2 | 100 | 330–420 | 75 | $(C_2F)_n$ |
| Example 5 | Synthetic Graphite (1–2 mm) | 30 | 150 | 5 | 100 | 330–550 | 70 | $(C_2F)_n$ |
| Example 6 | Natural Graphite (60 μm) | 30 | 150 | 5 | 500 | 330–560 | 70 | $(C_2F)_n$ |
| Example 7 | Petroleum Coke (1–5 mm) | 30 | 200 | 5 | 100 | 200–350 | 70 | $(CF)_n$ |
| Example 8 | Natural Graphite (60 μm) | 30 | 150 | 5 | 100 | 400–550 | 40 | $(CF)_n$ |
| Comparative Experiment | Synthetic Graphite (1–2 mm) | 200 | 150 | 1 | 100 | 330–380 | 60 | entirely decomposed at the stage of 95% conversion |

EXAMPLE 9

Use was made of a continuous process reaction apparatus of the type as shown in FIG. 3. The belt of the conveyor 42 was made of a 150-mesh screen of nickel wire and had a width of 600 mm and a length of 6000 mm. The reaction zone 47 in the apparatus was 4000 mm long, and both the preheating zone 45 and the cooling zone 49 were 1000 mm long.

A granular synthetic graphite about 1–2 mm in grain size was continuously supplied onto the belt conveyor 42, which was operated at a horizontal velocity of 60 mm/hr, such that the thickness of the graphite layer on the conveyor belt was constantly about 20 mm, and an equivolume mixture of fluorine gas and nitrogen gas was circulated through the reaction zone 47 at a linear velocity of 100 cm/sec. The mixed gas was heated so as to maintain a temperature of 360° C. while passing through the reaction zone 47.

By this process it was possible to continuously produce $(C_2F)_n$ at a rate of 1200 g/hr without suffering from decomposition of the product or the partly converted material on the belt conveyor 42.

EXAMPLE 10

In the apparatus used in Example 9, the belt of the conveyor 42 was replaced by one made of a 200-mesh screen of nickel wire. While the belt conveyor 42 was operated at a horizontal velocity of 80 mm/hr, petroleum coke about 1–5 mm in grain size was continuously supplied onto the belt conveyor 42 such that the thickness of the coke layer on the conveyor belt was constantly about 20 mm. The above mentioned mixed gas heated to 300° C. was circulated through the reaction zone 47 at a linear velocity of 1000 cm/sec.

By this process, $(CF)_n$ was continuously produced at a rate of 1200 g/hr without suffering from decomposition of the product or the partly converted material on the belt conveyor 42.

What is claimed is:

1. A method of preparing a graphite fluoride, which is expressed by $(CF_x)_n$ where x is in the range from 0.1 to 1.4, by heterogeneous contact reaction between a solid carbon material and fluorine gas, the method comprising the steps of:

placing a carbon material in the form of pieces smaller than about 10 mm in or on a holder so as to form a layer of the carbon material in or on said holder, said holder having a plurality of openings through which said fluorine gas can permeate into and pass through said layer of the carbon material;

introducing said holder into a reaction vessel such that gas passages are left around said holder; and keeping the carbon material in or on said holder heated at a temperature in the range from about 200° C. to about 550° C. without agitating said carbon material and, simultaneously forcibly passing said fluorine gas through said gas passages in the reaction vessel thereby allowing a portion of said fluorine gas to permeate into said layer of the carbon material through said openings of the holder and pass through said layer, whereby said reaction takes place not only at the surfaces of said layer of the carbon material but also in the interior of said layer.

2. A method according to claim 1, wherein said holder is in the shape of a box which is open at the top and has a plurality of openings in substantially the entire area of the bottom and side walls.

3. A method according to claim 2, wherein said holder is made of a screen of metal wire.

4. A method according to claim 2, wherein said holder is made of a metal plate formed with a plurality of apertures.

5. A method according to claim 1, wherein said holder is in the form of a belt of a belt conveyor, said belt being made of a screen of metal wire.

6. A method according to claim 1, wherein the thickness of said layer of the carbon material in the holder is such that the thickness of a layer of the graphite fluoride present in the holder after the reaction becomes below about 150 mm.

7. A method according to claim 1, wherein said small pieces are powder particles, the thickness of said layer of the carbon material in the holder being such that the thickness of a layer of the graphite fluoride present in the holder after the reaction becomes below about 70 mm.

8. A method according to claim 1, further comprising the step of heating the graphite fluoride present in the holder after the reaction to a temperature not higher than about 600° C. to cause crystallization of the graphite fluoride.

9. A method according to claim 1, wherein said graphite fluoride has a chemical structure expressed by $(C_2F)_n$, the carbon material in the holder in the reaction vessel is kept heated at a temperature in the range from about 300° C. to about 500° C.

10. A method according to claim 1, wherein said graphite fluoride has a chemical structure expressed by $(CF)_n$, the carbon material in the holder in the reaction vessel is kept heated at a temperature in the range from about 200° C. to about 550° C.

11. A method according to claim 1, wherein said fluorine gas is a mixture of fluorine gas and another gas which is inactive to said carbon material and said graphite fluoride.

12. A method according to claim 1, wherein said carbon material is selected from the group consisting of natural graphite, synthetic graphite, petroleum coke, carbon black and activated carbon.

13. A method according to claim 1, further comprising the step of placing a plurality of pieces of a metal which is resistant to fluorine gas at high temperatures in said layer of the carbon material in the holder prior to the introduction of the holder into the reaction vessel.

14. A method of preparing a graphite fluoride, which is expressed by $(CF_x)_n$ where x is in the range from 0.1 to 1.4, by heterogeneous contact reaction between a solid carbon material and fluorine gas, the method comprising the steps of:

placing a carbon material in the form of pieces smaller than about 10 mm in or on a holder so as to form a layer of the carbon material in or on said holder, said holder comprising at least two box shaped apparatus which are open at the top and which have a plurality of openings in substantially the entire area of the bottom and the side walls, through which said fluorine gas can permeate into and pass through said layer of the carbon materials;

introducing said holder into a reaction vessel, said reaction vessel having support means for supporting the holder such that said at least two box shaped apparatus are arranged in a multi-decker arrangement with a vertical distance between each box shaped apparatus, such that gas passages are left around said holder; and keeping the carbon material in or on said holder heated at a temperature in the range from about 200° C. to about 550° C. without agitating the carbon material and, simultaneously forcibly passing a fluorine gas through said gas passages in the reaction vessel, thereby allowing a portion of said fluorine gas to permeate into said layer of the carbon material through said openings of the holder and pass through said layer, whereby said reaction takes place not only at the surfaces of said layer of the carbon material but also in the interior of said layer.

15. A method of preparing a graphite fluoride, which is expressed by $(CF_x)_n$ where x is in the range from 0.1 to 1.4, by heterogeneous contact reaction between a solid carbon material and fluorine gas, the method comprising the steps of:

placing a carbon material in the form of pieces smaller than about 10 mm in or on a holder so as to form a layer of the carbon material in or on said holder, said holder having a plurality of openings through which said fluorine gas can permeate into and pass through said layer of the carbon material;

introducing said holder into a reaction vessel such that gas passages are left around said holder, said reaction vessel comprising a horizontally moving belt conveyor, said holder being in the form of the belt of said moving belt conveyor, said belt being made of a screen of metal wire; and keeping the carbon material in or on said holder heated at a temperature in the range from about 200° C. to about 550° C. without agitating said carbon material and, simultaneously forcibly passing said fluorine gas through said gas passages in the reaction vessel thereby allowing a portion of said fluorine gas to permeate into said layer of the carbon material through said openings of the holder and pass through said layer, whereby said reaction takes place not only at the surfaces of said layer of the carbon material but also in the interior of said layer.

* * * * *